United States Patent
Li et al.

(10) Patent No.: US 11,483,813 B2
(45) Date of Patent: Oct. 25, 2022

(54) SIGNAL TRANSMISSION METHOD, COMMUNICATION DEVICE AND STORAGE MEDIUM

(71) Applicant: ZTE CORPORATION, Guangdong (CN)

(72) Inventors: Nan Li, Guangdong (CN); Kaiying Lv, Guangdong (CN); Chen Lu, Guangdong (CN); Ning Wei, Guangdong (CN); Zhiqiang Han, Guangdong (CN); Bo Sun, Guangdong (CN)

(73) Assignee: ZTE Corporation, Shenzhen (CN)

( * ) Notice: Subject to any disclaimer, the term of this patent is extended or adjusted under 35 U.S.C. 154(b) by 245 days.

(21) Appl. No.: 16/612,378

(22) PCT Filed: Apr. 16, 2018

(86) PCT No.: PCT/CN2018/083214
§ 371 (c)(1),
(2) Date: Nov. 9, 2019

(87) PCT Pub. No.: WO2018/205799
PCT Pub. Date: Nov. 15, 2018

(65) Prior Publication Data
US 2021/0160825 A1 May 27, 2021

(30) Foreign Application Priority Data
May 11, 2017 (CN) .......................... 201710329202.4

(51) Int. Cl.
*H04W 72/04* (2009.01)
*H04W 52/02* (2009.01)
*H04W 56/00* (2009.01)

(52) U.S. Cl.
CPC ..... *H04W 72/042* (2013.01); *H04W 52/0235* (2013.01); *H04W 56/0015* (2013.01)

(58) Field of Classification Search
CPC ..... H04L 5/001; H04L 5/0053; H04L 5/0048; H04L 5/0091; H04W 52/0235;
(Continued)

(56) References Cited

U.S. PATENT DOCUMENTS 10,178,694 B2 * 1/2019 Ghosh ............... H04W 72/0453
10,897,739 B2 * 1/2021 Kim .................. H04W 52/0235
(Continued)

FOREIGN PATENT DOCUMENTS

| CN | 1926591 A | 3/2007 |
|----|-----------|--------|
| CN | 102469561 A | 5/2012 |

(Continued)

OTHER PUBLICATIONS

Extended European Search Report for EP Patent Application No. 18799268.0, dated Jan. 29, 2021, 9 pages.
(Continued)

*Primary Examiner* — Robert J Lopata
(74) *Attorney, Agent, or Firm* — Perkins Coie LLP

(57) ABSTRACT

The present invention relates to wireless communication technology, and particularly relates to a signal transmission method and a communication device. The signal transmission method includes: transmitting, by a first communication node, a signal on one or more first channels located in a primary transmission channel and/or a secondary transmission channel of the first communication node, and before transmitting the signal, performing channel protection on a transmission channel where the first channel is located and/or the primary transmission channel. Correspondingly, further provided is a communication device.

20 Claims, 15 Drawing Sheets

(58) Field of Classification Search
CPC ........... H04W 56/0015; H04W 72/042; H04W 74/0816; Y02D 30/70
USPC .......................................................... 370/329
See application file for complete search history.

(56) References Cited

U.S. PATENT DOCUMENTS

| | | | |
|---|---|---|---|
| 2005/0136833 | A1 | 6/2005 | Emeott et al. |
| 2011/0237239 | A1* | 9/2011 | Chou .................... H04W 48/08 455/422.1 |
| 2012/0134324 | A1* | 5/2012 | Chu .................. H04W 74/0816 370/329 |
| 2013/0176980 | A1 | 7/2013 | Kneckt et al. |
| 2014/0211678 | A1 | 7/2014 | Jafarian et al. |
| 2015/0146678 | A1* | 5/2015 | Kondylis .............. H04L 5/0073 370/330 |
| 2016/0261451 | A1* | 9/2016 | Li ........................ H04L 27/2666 |
| 2017/0202011 | A1* | 7/2017 | Trainin ............. H04W 52/0216 |
| 2017/0265186 | A1* | 9/2017 | Cariou .............. H04W 72/0406 |
| 2018/0098336 | A1* | 4/2018 | Alpert ................... H04W 16/10 |
| 2019/0335487 | A1* | 10/2019 | Son ........................ H04L 1/0078 |
| 2020/0178171 | A1* | 6/2020 | Lou ................... H04W 52/0225 |
| 2020/0275373 | A1 | 8/2020 | Hwang et al. |

FOREIGN PATENT DOCUMENTS

| | | |
|---|---|---|
| CN | 103098514 A | 5/2013 |
| WO | 2018208058 A1 | 11/2018 |

OTHER PUBLICATIONS

Ryu et al. "Overall MAC Procedure for WUR," Nov. 7, 2016, IEEE 802.11-16/1445r1, XP068110861, Retrieved from the Internet: URL:https://mentor.ieee.org/802.11/dcn/16/11-16-1445-01-0wur-overall-mac-procedure-for-wur.pptx, 10 pages.
WIPO, International Search Report dated Jun. 12, 2018.

* cited by examiner

SIGNAL TRANSMISSION METHOD, COMMUNICATION DEVICE AND STORAGE MEDIUM

CROSS-REFERENCE TO RELATED APPLICATION

The present application is a National Phase Application filed under 35 U.S.C. 371 as a national stage of PCT/CN2018/083214, filed on Apr. 16, 2018, an application claiming the priority to Chinese Patent Application No. 201710329202.4 filed on May 11, 2017, the disclosure of which are hereby incorporated by reference in their entirety.

TECHNICAL FIELD

The present disclosure relates to the wireless communication technology, and more particularly, to a signal transmission method, a communication device and a storage medium.

BACKGROUND

According to spectrum planning of countries or regions, unlicensed frequency band used by a wireless system may be divided into multiple channels in advance. Each channel is numbered, and has parameters such as a start frequency, a channel spacing, a bandwidth size, and so on. Taking frequency bands of 2.4 GHz and 5 GHz as an example, default bandwidth of each channel is 20 MHz. A communication node may select a channel of 20 MHz bandwidth as a primary transmission channel, and may also use multiple channels of 20 MHz bandwidth simultaneously as secondary transmission channels. The bandwidths of a certain type of channels in a communication node or a system configuration may be smaller than the bandwidth used for data transmission, and the number of that may be one or more. This involves how to transmit signals on these particular channels and how to protect the channels while transmitting the signal.

SUMMARY

The embodiments of the present disclosure provide a signal transmission method, a communication device and a storage medium, as well as a communication method, a communication device and a storage medium which are used for channel protection during signal transmission.

In order to achieve the targets of the present disclosure, an embodiment of the present disclosure provides a signal transmission method including: transmitting, by a first communication node, a signal on one or more first channels which are located in a primary transmission channel and/or a secondary transmission channel of the first communication node, performing channel protection on a transmission channel in which the first channel is located and/or the primary transmission channel before transmitting the signal.

An embodiment of the present disclosure further provides a communication method applied to a second communication node, the method including: receiving, by the second communication node, a signal transmitted by a first communication node on a first channel, wherein the first channel is located in a primary transmission channel and/or a secondary transmission channel of the first communication node.

An embodiment of the present disclosure further provides a communication device including a transmitter and a processor, the transmitter being configured to: transmit a signal on one or more first channels which are located in a primary transmission channel and/or a secondary transmission channel of a first communication node; and perform channel protection on a transmission channel in which the first channel is located and/or the primary transmission channel before transmitting the signal; the processor being coupled to the transmitter.

An embodiment of the present disclosure further provides another communication device including a receiver and a processor, the receiver being configured to receive a signal transmitted by a first communication node on a first channel, wherein the first channel is located in a primary transmission channel and/or a secondary transmission channel of the first communication node; the processor being coupled to the receiver.

An embodiment of the present disclosure further provides a storage medium including a stored program which, when executed by a processor, cause the processor to perform the above signal transmission method.

According to the methods, the communication devices and the storage provided by the present disclosure, it is achieved to transmit a signal on multiple first channels and protect a channel for transmitting the signal during the signal transmission, thereby reducing system loss and interference.

Other features and advantages of the present disclosure will be set forth in the following description, and will be partially apparent from the description, or be understood by implementing the present disclosure. The targets and other advantages of the present disclosure may be achieved and obtained by means of the structures particularly pointed in the description, the claims and the drawings.

BRIEF DESCRIPTION OF THE FIGURES

The drawings constituting a part of the specification are provided for further understanding technical solutions of the present disclosure, intended to explain the technical solutions of the present disclosure together with embodiments of the present disclosure, and should not be considered as a limitation of the technical solutions of the present disclosure.

DETAILED DESCRIPTION

The Internet-of-Things (IoT) industry is developing rapidly. A large number of IoT devices are connected to the network and connected to each other in a wired or wireless manner, covering many fields such as intelligent transportation, environmental protection, public safety, safe home, industrial monitoring, personal health, and the like. IoT applications involve a huge number of IoT devices, which are massive terminals. Most of these terminals work on battery power. In most application scenarios, such as water quality monitoring, environmental monitoring and industrial monitoring, the devices are installed at locations not convenient to detect and repair and to replace the battery at any time. In some other scenarios, such as intelligent transportation, power meter reading, etc., service providers also hope that once a device is installed, it can last for months or even years without replacing the battery, which requires the IoT device to have a high-performance power saving mechanism.

Figure 1:
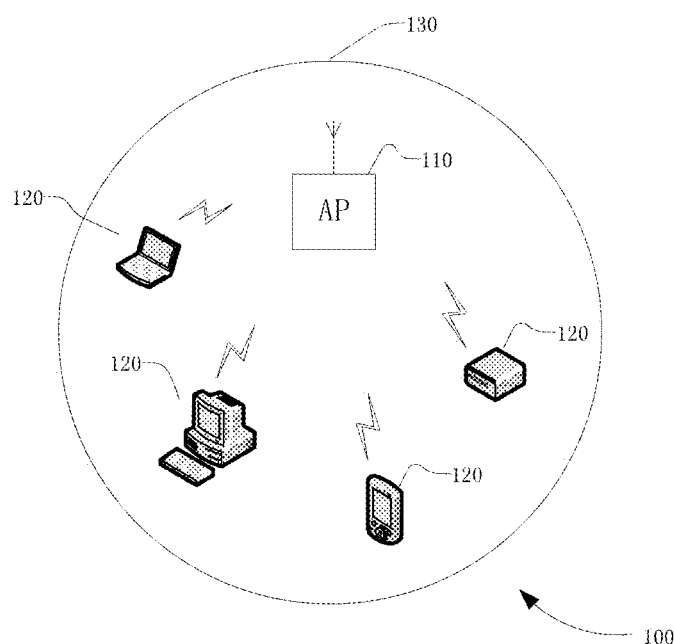
FIG. 1 is a WLAN system to which an embodiment of the present disclosure may be applied.

FIG. 1 is a wireless local area network (WLAN) system to which an embodiment of the present disclosure may be applied. As shown in FIG. 1, the WLAN system 100 includes an access point (AP) 110 and a non-AP station (non-AP STA, referred to as STA) 120. Generally, the AP 110 establishes a basic service set (BSS) 130, and the STA 120 associates with the AP 110 by processes such as scanning, authentication, association, and the like, and communicates with the AP 110 or communicates with other STAs 120 through the AP 110. In another wireless local area network, there may be no access point similar to the AP, and all stations may communicate directly with each other. For example, in an independent BSS (IBSS), there are no access point similar to the AP. Therefore, an AP or an STA in the above networks may be collectively referred to as a wireless communication node.

Figure 2:
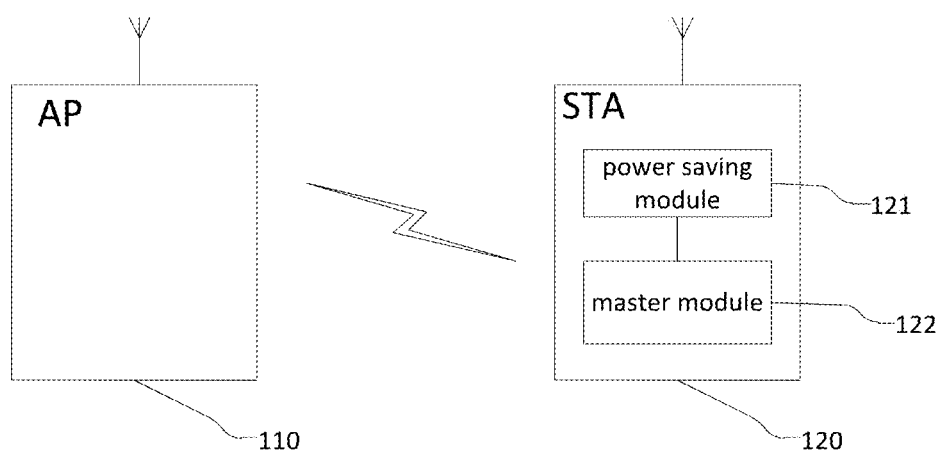
FIG. 2 is a schematic diagram of a power saving mechanism of a WLAN system according to an embodiment.

In the WLAN system, a feasible power saving mechanism is to add a power saving module to an IoT device with wireless communication capability. FIG. 2 is a schematic diagram of a power saving mechanism of the WLAN system according to an embodiment. As shown in FIG. 2, the STA 120 includes a power saving module 121 and a master module 122. The master module 122 may be a module in logical concept, which is a collection of modules other than the power saving module in the device, such as a collection of a sensor module, a microprocessor module, a memory module, a wireless communication module, and the like. The STA 120 may only keep the power saving module 121 working for receiving a wakeup signal when there is no service, that is, when the power saving module 121 is turned on, the device may close the master module 122. When the AP 110 needs to transmit downlink data to the STA 120, the AP 110 first transmits the wakeup signal to the STA 120. The power saving module 121 of the STA 120 receives the wakeup signal, and confirms that the wakeup signal is transmitted to itself, and then starts the master module 122 and perform related operations, such as receiving the downlink data from the AP 110, according to the content of the wakeup signal. Generally, the power saving module consumes very little power during operation, typically in the order of microwatt. The power saving module needs to monitor whether there is the wakeup signal transmitted to itself. Once received, the other modules are triggered to work according to the request of the wakeup signal, for example, the micro-processing module, the wireless communication module, and the like, are turned on. This achieves the effect of power saving.

Figure 3:
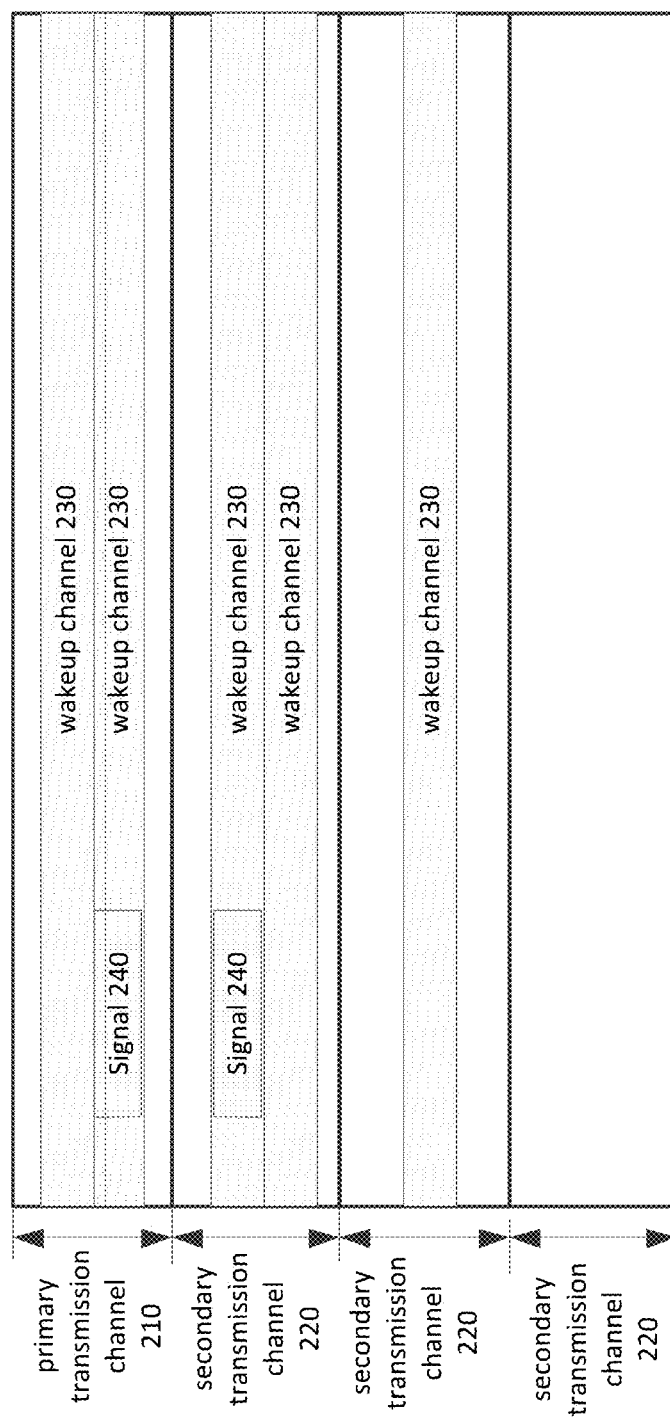
FIG. 3 is a schematic diagram of channel division according to an embodiment.

According to spectrum planning of countries or regions, unlicensed frequency band used by the WLAN system may be divided into multiple channels in advance. Each channel is numbered, and has parameters such as a start frequency, a channel spacing, a bandwidth size, and so on. Taking frequency bands of 2.4 GHz and 5 GHz as an example, default bandwidth of each channel is 20 MHz. As shown in FIG. 3, a primary transmission channel 210 and secondary transmission channels 220 are included in one working bandwidth of the AP. In some embodiments, the AP selects a certain channel of 20 MHz bandwidth as the primary transmission channel to establish the BSS, and may also use multiple channels of 20 MHz bandwidth simultaneously as the secondary transmission channels. The bandwidth of the working channel of the AP may be 20/40/80/160/80+80 MHz (for a case that two channels of 80 MHz bandwidth are not continuous). According to FIGS. 1 to 3, in some embodiments, the AP 110 periodically transmits a beacon frame including a capability parameter of the AP 110. The beacon frame has a signal format that the master module 122 of the STA may resolve. In the BSS 130, the AP 110 is the time reference of the BSS 130, and carries the current time information of the AP in each beacon frame. All the STAs 120 in the BSS that receive the beacon frame need to synchronize and calibrate with the time information transmitted by the AP 110. The beacon frame of the AP 110 may be transmitted on the primary transmission channel of the AP 110, and the bandwidth of the beacon frame is equal to the bandwidth of the primary transmission channel.

The AP or the system configuration may configure one or more wakeup channels 230 in the primary transmission channel 210 and/or the secondary transmission channels 220. The wakeup channel 230 is used for transmitting a signal 240 that the power saving module 121 of the STA can resolve to the STA 120. The modulation and coding scheme of the signal 240 may be the same as or different from that of the signal transmitted and received by the master module 122 of the STA 120. The signal 240 may be a wakeup signal or a wakeup beacon frame. The bandwidth of the wakeup channel is typically less than the bandwidth used by the AP and STA for data transmission. The locations of the wakeup channels may be disposed as follows: the wakeup channels are all located in the primary transmission channel of the AP, or the wakeup channels are all located in the secondary transmission channels of the AP, or the wakeup channels are located in the primary transmission channel and the secondary transmission channels of the AP. The main function of the wakeup beacon frame is to declare the existence of the BSS established by the AP, and to transmit the current clock information of the AP in the BSS, in order that the STA performs network probe and clock calibration. The information carried in the wakeup beacon frame may include at least one of the following: identification information of the AP, current time information of the AP, and transmission cycle of the wakeup beacon frame. The identification information of the AP is as follows: entire or part of a universally unique identifier (such as the Media Access Control (MAC) address) assigned to the AP, or entire or part of a unique identifier in the BSS assigned to the AP, or entire or part of a non-universally unique identifier (such as the BSS color) assigned to the AP.

In some embodiments, the AP indicates, in a beacon frame, a probe response frame or an association response frame transmitted by itself, whether the power saving mode of the STA is supported and which type of power saving mode is specifically supported by itself. Correspondingly, in a probe request frame or an association request frame, the STA also declares to the AP whether the power saving mode is supported and which type of power saving mode is specifically supported by itself. If both the AP and the STA support the power saving mode in which only the power saving module keeps working, they further negotiate on various parameters of the power saving mode, for example, a working mode of the power saving module (normal-on mode or periodic-on mode of the power saving module), a length and a cycle of a wakeup window for the periodic-on mode, a channel on which the STA monitors the wakeup signal (i.e., the wakeup channel), and the like.

In some embodiments, the AP transmits a signal on the wakeup channel in a contention mode. Specifically, the AP contends for access by using parameters of any access type in the enhanced distributed channel access (EDCA), or parameters of an access type having the highest priority, or parameters of a specific access type defined for the signal, or by using point coordination function interframe space (PIFS).

Figure 4:
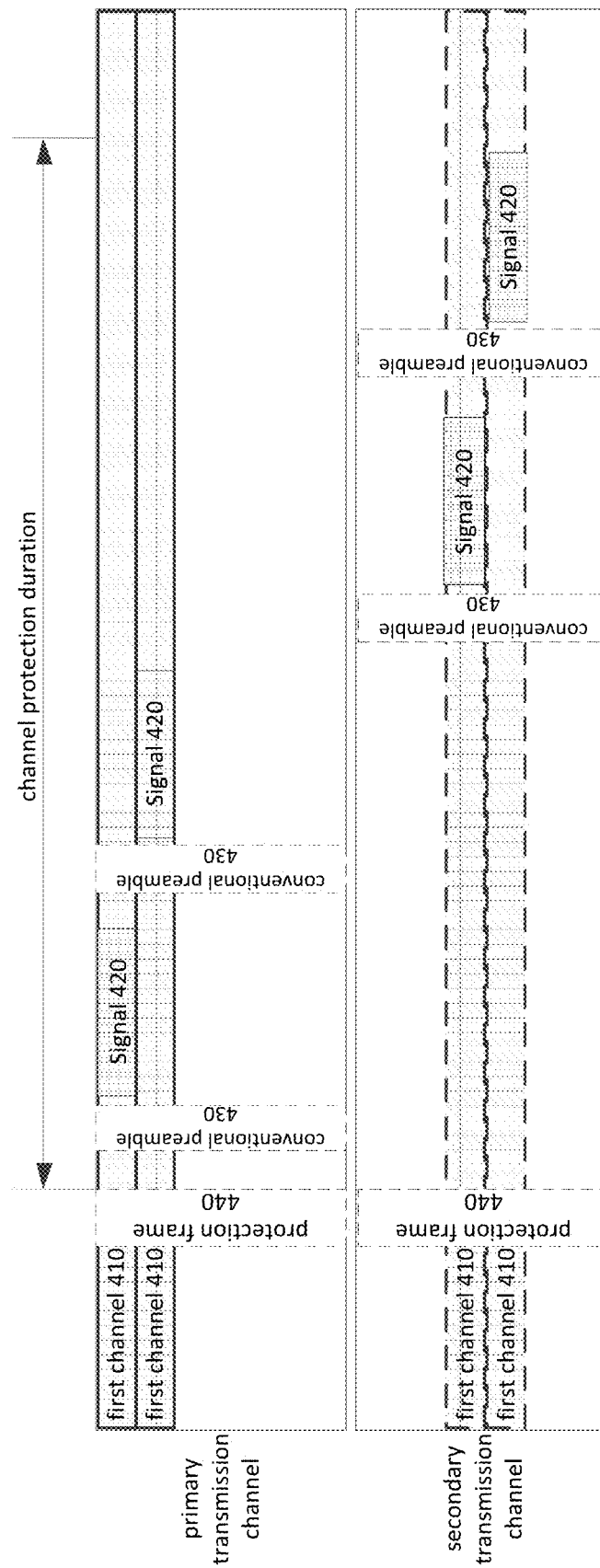
FIG. 4 is a schematic diagram of a signal transmission method according to an embodiment of the present disclosure.

FIG. 4 is a schematic diagram of a signal transmission method according to an embodiment of the present disclosure. As shown in FIG. 4, a first communication node transmits a signal 420 on one or more first channels 410, wherein the first channel 410 is located in a primary transmission channel and/or a secondary transmission channel of the first communication node. Before transmitting the signal 420, channel protection is performed on a transmission channel in which the first channel 410 is located and/or the primary transmission channel.

In some embodiment, the first channel 410 is a wakeup channel, and has a bandwidth less than that of the transmission channel in which the first channel 410 is located. The signal 420 has a bandwidth equal to that of the first channel 410. The signal 420 may be a wakeup beacon frame or a wakeup signal. The channel protection may be realized by one of the following methods.

Method 1: transmitting a conventional preamble 430 before transmitting the signal 420. The conventional preamble 430 carries information about a length of time that a medium is to be occupied by the first communication node. In some embodiments, the conventional preamble is located at a starting position of the signal 420; or a transmission interval between the conventional preamble 430 and the signal 420 is a short interframe space (SIFS).

Here, before the signal 420 is transmitted, a wakeup preamble and a frame body are also transmitted.

Method 2: transmitting a protection frame 440 identifiable by a conventional station before transmitting the signal 420. The protection frame 440 carries the information about a length of time that the medium is to be occupied by the first communication node. In some embodiments, the protection frame 440 is a Clear-to-send (CTS) frame for which a reception address is a MAC address of the first communication node, or is a null data packet that only includes a conventional preamble.

Method 3: transmitting a radio frame (not shown in Figures) before transmitting the signal 420. The radio frame carries the information about a length of time that the medium to be occupied by the first communication node. In some embodiments, the information, carried by the radio frame, about the length of time that the medium to be occupied by the first communication node may represent a period of time during which the first communication node occupies the first channel in the primary transmission channel and/or the secondary transmission channel, and during which only the first communication node is allowed to perform transmission in the present BSS.

The above-mentioned the length of time that the medium to be occupied may also be called as a channel protection duration, which may be mixed in various embodiments of the inventors without distinction.

In Method 1, transmitting the conventional preamble 430 may include at least one of the following: transmitting one conventional preamble before transmitting the first signal; transmitting one conventional preamble before transmitting each signal, the conventional preambles corresponding to respective signals may be same or different.

In some embodiments, transmitting the conventional preamble 430 may include at least one of the following: transmitting the conventional preamble 430 in the primary transmission channel, wherein a bandwidth of the conventional preamble 430 is equal to a bandwidth of the primary transmission channel; transmitting the preamble in one or more secondary transmission channels in which the first channel 410 is located, wherein the bandwidth of the conventional preamble 430 is equal to a bandwidth of the secondary transmission channel where the first channel 410 is located.

In Method 2, transmitting the protection frame 440 may include at least one of the following: transmitting the protection frame 440 in the primary transmission channel, wherein a bandwidth of the protection frame 440 is equal to the bandwidth of the primary transmission channel; and transmitting the protection frame 440 in one or more secondary transmission channels in which the first channel 410 is located, wherein the bandwidth of the protection frame 440 is equal to a bandwidth of the secondary transmission channel where the protection frame 440 is located.

In some embodiments, a predetermined number of first channels may be selected from the plurality of first channels to transmit signals. For example, if the total number of the first channels is 10 and the predetermined number is 1 or 2, one first channel or two first channels is/are selected from all 10 first channels. A predetermined number of first channels may also be selected from a plurality of first channels located in a same transmission channel. For example, in a case that there are three first channels in the primary transmission channel and three first channels in the secondary transmission channel, one first channel for transmitting signal is selected from those in the primary transport channel and one first channel for transmitting signal from those in the secondary transmission channel.

In some embodiments, the first communication node may also transmit a first information before transmitting the signal 420. The first information indicates at least one of the following: the first channel allocated for a second communication node, and a transmission cycle of the signal 420.

Correspondingly, an embodiment of the present disclosure further provides a communication method applied to the second communication node, including: receiving, by the second communication node, a signal transmitted by the first communication node on a first channel, wherein the first channel is located in a primary transmission channel and/or a secondary transmission channel of the first communication node. In some embodiments, when the signal is a wakeup beacon frame, the second communication node receives the wakeup beacon frame on the first channel according to a transmission cycle of the wakeup beacon frame when a transmission timing arrives.

In some embodiments, before receiving the signal, the second communication node may also receive a first information transmitted by the first communication node. The first information includes at least one of the following: the first channel allocated for the second communication node by the first communication node, and a transmission cycle of the signal.

If the first channel allocated for the second communication node to receive the wakeup signal by the first communication node is different from a wakeup channel for receiving the wakeup beacon frame, the second communication node receives the wakeup signal on the first channel for transmitting the wakeup signal, and, before a transmitting timing of the wakeup beacon frame arrives, is switched to the first channel for transmitting the wakeup beacon frame to receive the wakeup beacon frame.

Figure 5:
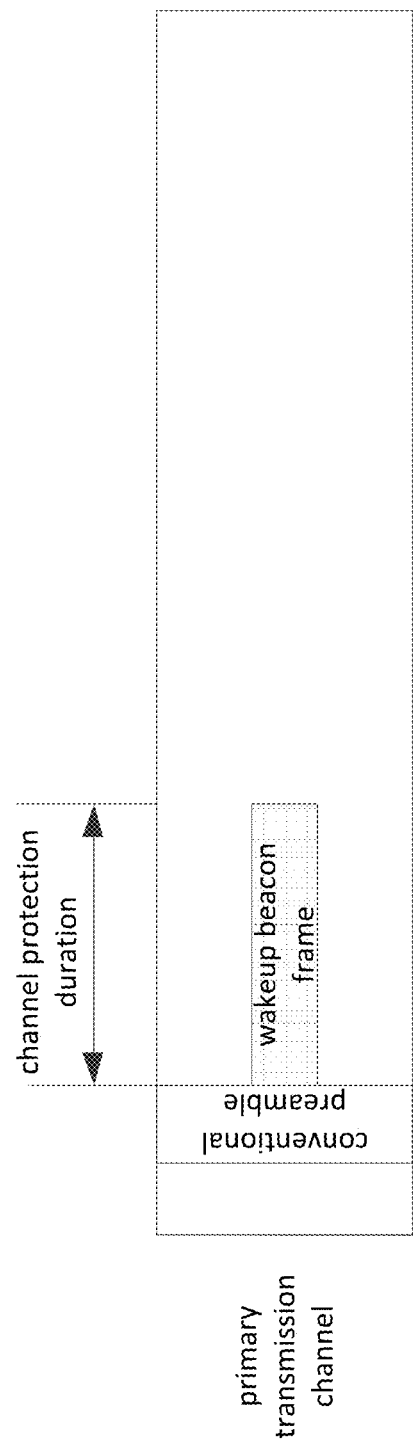
FIG. 5 is a schematic diagram of a first specific embodiment of the present disclosure.

FIG. 5 is a schematic diagram of a first specific embodiment of the present disclosure. As shown in FIG. 5, the number of the wakeup channel is one, and the wakeup channel is located in the primary transmission channel of the AP. The AP transmits a wakeup beacon frame on the wakeup channel. The bandwidth of the wakeup beacon frame is equal to that of the wakeup channel.

To protect the transmission of the wakeup beacon frame, the AP may use a conventional preamble and/or a protection frame to protect the transmission.

In a case that the conventional preamble is used, the conventional preamble is included in the preamble of the wakeup beacon frame by the AP. The conventional preamble is located at the starting position of the wakeup beacon frame, and used to notify a conventional terminal of the time required for the media to be occupied by the current signaling transmission, so as to prevent the subsequent transmission of the wakeup beacon frame from being interfered. The conventional terminal includes a terminal that works according to the following standards: 802.11a, 802.11ac, 802.11ax, etc. The bandwidth of the conventional preamble is equal to that of the primary transmission channel of the AP.

In a case that the protection frame is used, before the wakeup beacon frame is transmitted (in this case, the wakeup beacon frame may or may not include a conventional preamble), the AP transmits a protection frame that is identifiable by a conventional station, to notify the conventional terminal of the time required for the media to be occupied by itself. The bandwidth of the protection frame is equal to that of the primary transmission channel of the AP. The channel occupation duration reserved by the protection frame is not less than the duration for the AP to transmit the wakeup beacon frame on the wakeup channel. An interval between the protection frame and the wakeup beacon frame is the short interframe interval SIFS. The protection frame is, for example, a CTS frame for which a reception address is a MAC address of the AP itself, or is a null data packet that only includes the conventional preamble.

Figure 6:
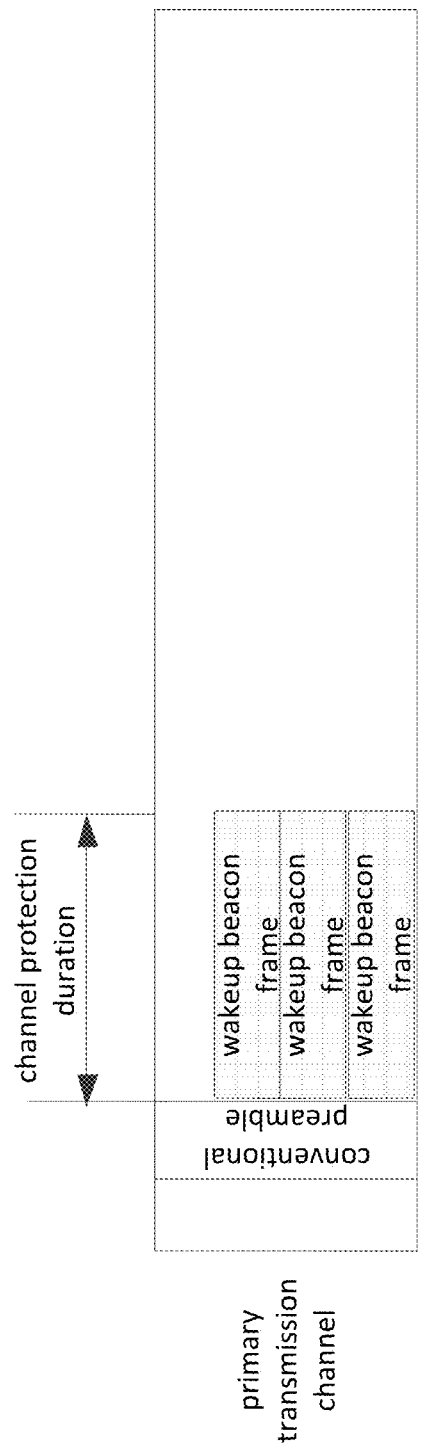
FIG. 6 is a schematic diagram of a first implementation of a second specific embodiment of the present disclosure.

FIG. 6 is a schematic diagram of a first implementation of a second specific embodiment of the present disclosure. As shown in FIG. 6, there are multiple wakeup channels located in the primary transmission channel of the AP. The AP transmits the wakeup beacon frames on all wakeup channels. The AP simultaneously transmits the wakeup beacon frames in parallel on the multiple wakeup channels, and the bandwidth of each wakeup beacon frame is equal to the bandwidth of the wakeup channel in which the wakeup beacon frame is located. The AP may use a conventional preamble and/or a protection frame for transmission protection. If the preamble of the wakeup beacon frame includes a conventional preamble, the conventional preamble is located at the starting position of the wakeup beacon frame, the wakeup beacon frames on all the wakeup channels adopt a same conventional preamble, and the bandwidth of the conventional preamble is equal to the bandwidth of the primary transmission channel of the AP. In a case that the AP uses the protection frame, before the wakeup beacon frame is transmitted (in this case the wakeup beacon frame may or may not include a conventional preamble), the AP transmits the protection frame, and an interval between the protection frame and the wakeup beacon frame is the SIFS. The bandwidth of the protection frame is equal to that of the primary transmission channel of the AP.

Figure 7:
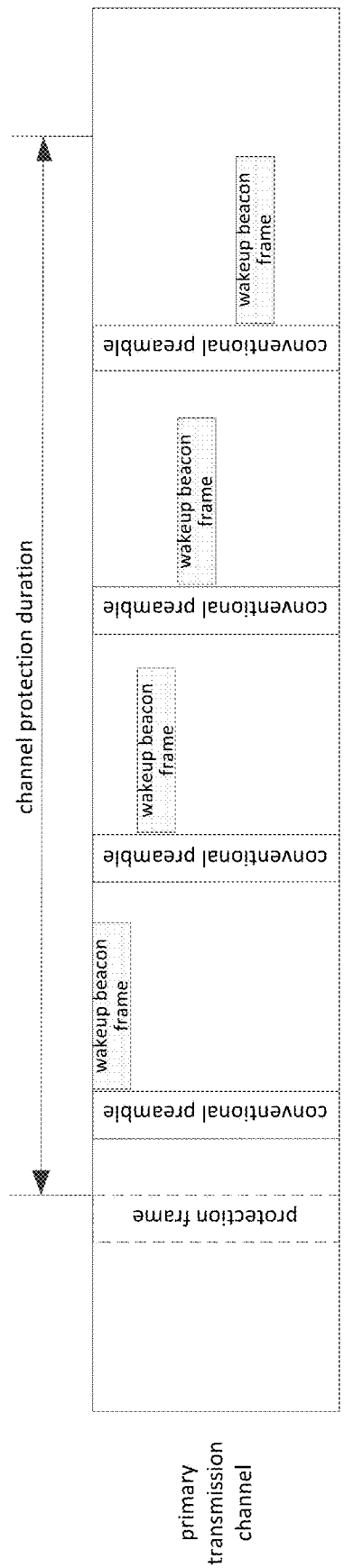
FIG. 7 is a schematic diagram of a second implementation of the second specific embodiment of the present disclosure.

FIG. 7 is a schematic diagram of a second implementation of the second specific embodiment of the present disclosure. As shown in FIG. 7, the AP transmits multiple wakeup beacon frames in a predetermined order on multiple wakeup channels. The order of transmission may be from low to high, or high to low, based on a center frequency of the wakeup channels, or in ascending or descending order of a logical number of the wakeup channels. There is a certain interval, such as at least the SIFS, between the wakeup beacon frames on two adjacent wakeup channels. The AP uses a conventional preamble and/or a protection frame for transmission protection. In a case that the conventional preamble is used, the AP transmits the conventional preamble at the starting position of each wakeup beacon frame, and the bandwidth of the conventional preamble is equal to that of the primary transmission channel of the AP. In a case that the protection frame is used for transmission protection, before the first wakeup beacon frame is transmitted (in this case the wakeup beacon frame may or may not include a conventional preamble), the AP transmits the protection frame identifiable by a conventional station, and the bandwidth of the protection frame is equal to that of the primary transmission channel of the AP. The channel occupation duration reserved by the protection frame is not less than a total duration for the AP to transmit the wakeup beacon frames on the multiple wakeup channels. If the AP uses the protection frame, the AP may directly transmit the wakeup beacon frames without using a contention access mode when the AP transmits the wakeup beacon frames on the multiple wakeup channels. An interval between the protection frame and the first wakeup beacon frame is a short interframe space (SIFS). In addition to the transmission protections by using the conventional preamble and/or the protection frame, the AP may also transmit a radio frame before transmitting the first wakeup beacon frame, and the radio frame carries a length of a protection period for notifying the AP of the duration that the channels are occupied by transmitting the multiple wakeup beacon frames on the multiple wakeup channels. Within the duration, only the AP is allowed to transmit in the BSS. The bandwidth of the radio frame is equal to that of the primary transmission channel. Different from a protection frame identifiable by a conventional state, this mode does not restrict the stations of other BSSs from transmitting on the channel during the period of time in which the AP is transmitting.

Figure 8:
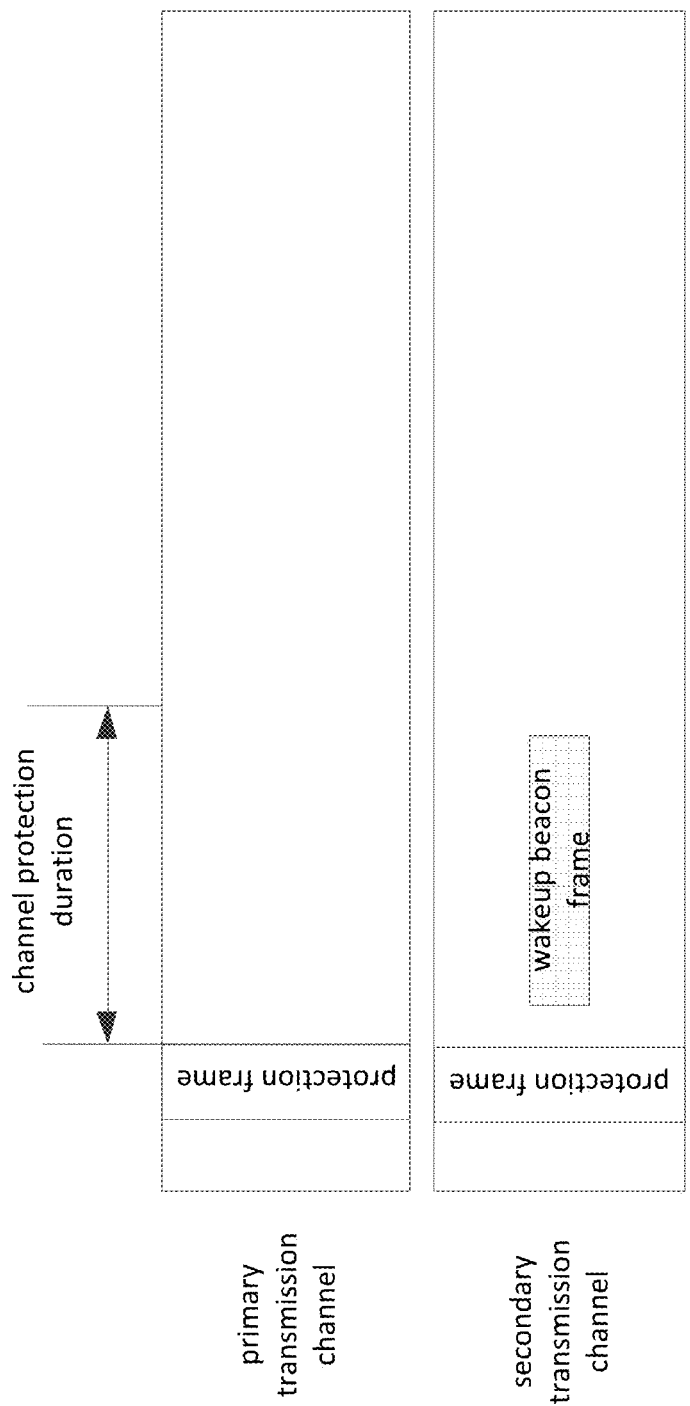
FIG. 8 is a schematic diagram of a third specific embodiment of the present disclosure.

FIG. 8 is a schematic diagram of a third embodiment of the present disclosure. As shown in FIG. 8, there is one wakeup channel located in the secondary transport channel of the AP. The AP transmits a wakeup beacon frame on the wakeup channel on the secondary transport channel, and the bandwidth of the wakeup beacon frame is equal to that of the wakeup channel. To protect the transmission of the wakeup beacon frame, the AP may use a conventional preamble and/or a protection frame for transmission protection. In a case that the conventional preamble is used for transmission protection, the conventional preamble is transmitted at the starting position of each wakeup beacon frame, and the bandwidth of the conventional preamble is equal to that of the secondary transmission channel of the AP. In a case that the protection frame is used for transmission protection, the AP transmits the protection frame identifiable by a conventional station before transmitting the wakeup beacon frame (the wakeup beacon frame may or may not include a conventional preamble), and the bandwidth of the protection frame is equal to that of the secondary transmission channel of the AP. An interval between the protection frame and the wakeup beacon frame is the short interframe interval (SIFS). In the case that the protection frame is used, the first embodiment differs from the second embodiment in that the AP transmits the protection frame on the primary transmission channel to perform channel protection while transmitting the wakeup beacon frame on the secondary transmission channel, and the transmission bandwidth is equal to the bandwidth of the primary transmission channel. Because the contention access processes of the stations in the BSS (including the AP) are performed according to the busy/idle state of the primary transmission channel of the AP, the fact that the AP performs the channel reservation on the primary transmission channel while transmitting on the secondary transport channel can avoid unnecessary system loss and interference which may be caused by the transmission on the primary transmission channel by another station thinking that the primary transmission channel is idle (however, at this time the AP is in the transmission state, and cannot receive data transmitted by other stations, in fact).

Figure 9:
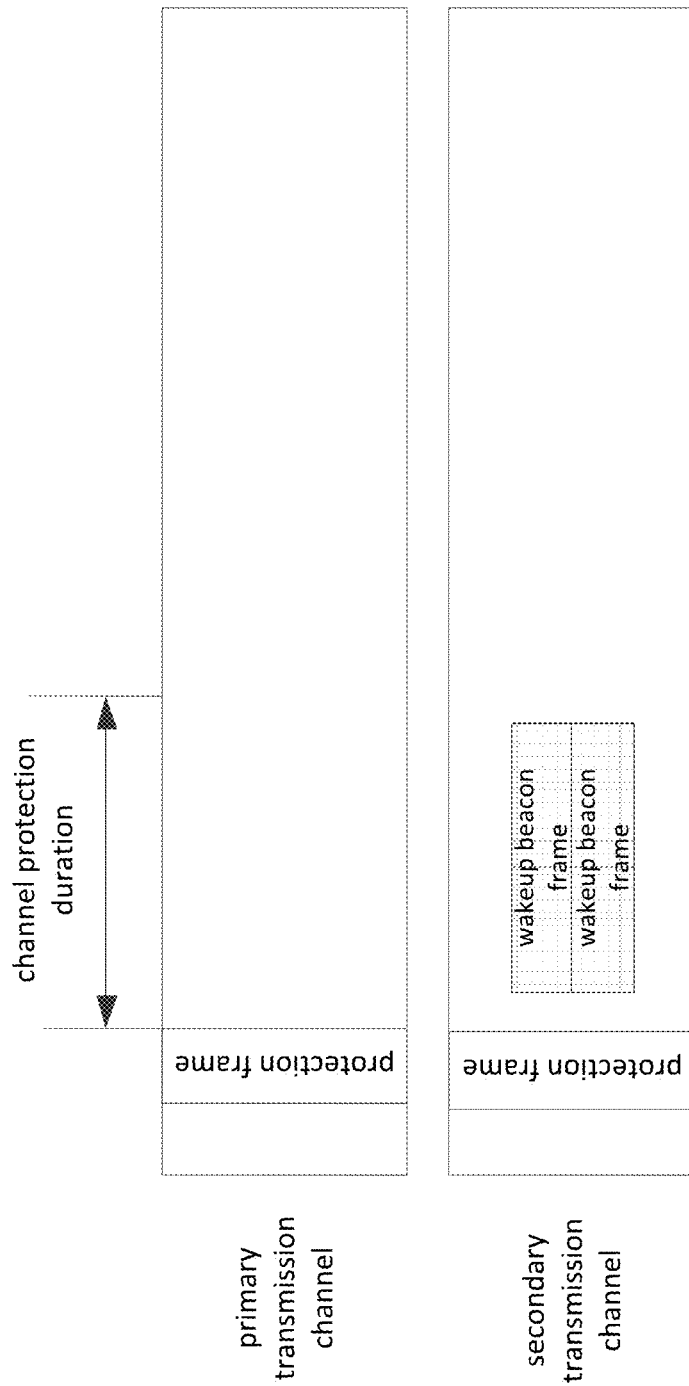
FIG. 9 is a schematic diagram of a first implementation of a fourth specific embodiment of the present disclosure.

FIG. 9 is a schematic diagram of a first implementation of a fourth embodiment of the present disclosure. As shown in FIG. 9, there are a multiple wakeup channels located in the secondary transmission channels of the AP. The AP transmits the wakeup beacon frames on the multiple wakeup channels. The AP simultaneously transmits the wakeup beacon frames in parallel on the multiple wakeup channels of the secondary transmission channel, and the bandwidth of each wakeup beacon frame is equal to the bandwidth of the wakeup channel in which the wakeup beacon frame is located. To protect the transmission of the wakeup beacon frames, the AP uses a conventional preamble and/or a protection frame. In a case that the conventional preamble is used, the conventional preamble is located at the starting position of the wakeup beacon frame. The wakeup beacon frames on all wakeup channels use a same conventional preamble. The bandwidth of the conventional preamble is equal to that of the secondary transmission channel of the AP. Optionally, before the wakeup beacon frame is transmitted (in this case the wakeup beacon frame may or may not include a conventional preamble), the AP transmits a protection frame identifiable by a conventional station, and the bandwidth of the protection frame is equal to that of the secondary transmission channel of the AP. An interval between the protection frame and the wakeup beacon frame is a short interframe interval (SIFS). The AP transmits the protection frame on the primary transmission channel to perform channel protection while transmitting the wakeup beacon frames on the secondary transmission channel, and the transmission bandwidth is equal to the bandwidth of the primary transmission channel.

Figure 10:
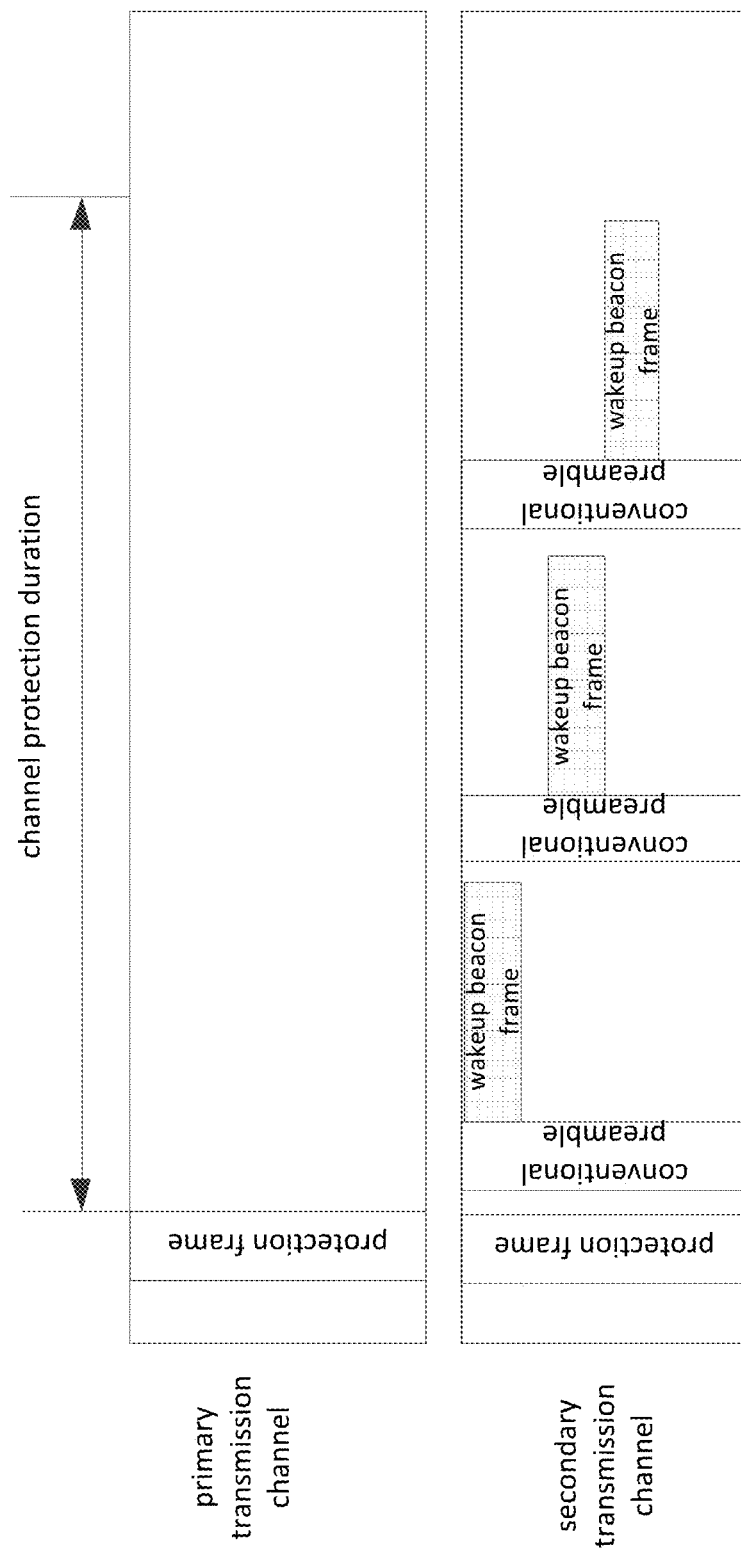
FIG. 10 is a schematic diagram of a second implementation of the fourth specific embodiment of the present disclosure.

FIG. 10 is a schematic diagram of a second implementation of the fourth embodiment of the present disclosure. As shown in FIG. 10, the AP transmits multiple wakeup beacon frames in a predetermined order on multiple wakeup channels of the secondary transmission channel. The order of transmission may be from low to high, or high to low, based on a center frequency of the wakeup channels, or in ascending or descending order of a logical number of the wakeup channels. There is a certain interval (at least the SIFS) between the wakeup beacon frames on two adjacent wakeup channels. The AP contends for transmitting the wakeup beacon frames on the multiple wakeup channels. There is a conventional preamble at the starting position of each wakeup beacon frame, and the bandwidth of the conventional preamble is equal to that of the primary transmission channel of the AP. Optionally, before the first wakeup beacon frame is transmitted, the AP transmits a protection frame identifiable by a conventional station to notify a conventional terminal of the time required for the media to be occupied by itself, and the bandwidth of the protection frame is equal to that of the secondary transmission channel of the AP. The channel occupation duration reserved by the protection frame is not less than a total duration for the AP to transmit the wakeup beacon frames on the multiple wakeup channels. If the AP uses the protection frame, the AP may directly transmit the wakeup beacon frames without using a contention access mode when the AP transmits the wakeup beacon frames on the multiple wakeup channels. An interval between the protection frame and the first wakeup beacon frame is a short interframe space (SIFS). The AP transmits the protection frame on the primary transmission channel for channel protection while transmitting the wakeup beacon frames on the secondary transmission channel, and the transmission bandwidth is equal to the bandwidth of the primary transmission channel. In addition to the transmission protections by using the conventional preamble and/or the protection frame, the AP may also transmit a radio frame on the primary transmission channel before transmitting the first wakeup beacon frame, and the radio frame carries a length of a protection period for notifying the AP of the duration that the channels are occupied by transmitting the multiple wakeup beacon frames on the multiple wakeup channels. Within the duration, only the AP is allowed to transmit in the BSS. In addition, in a case that the AP transmits the radio frame on the primary transmission channel to notify a channel protection period, it is unnecessary to transmit the protection frame for channel protection on the primary transmission channel. The protection frame may be transmitted only on the secondary transmission channel where the wakeup channels are located. The bandwidth of the radio frame is equal to that of the primary transmission channel.

Figure 11:
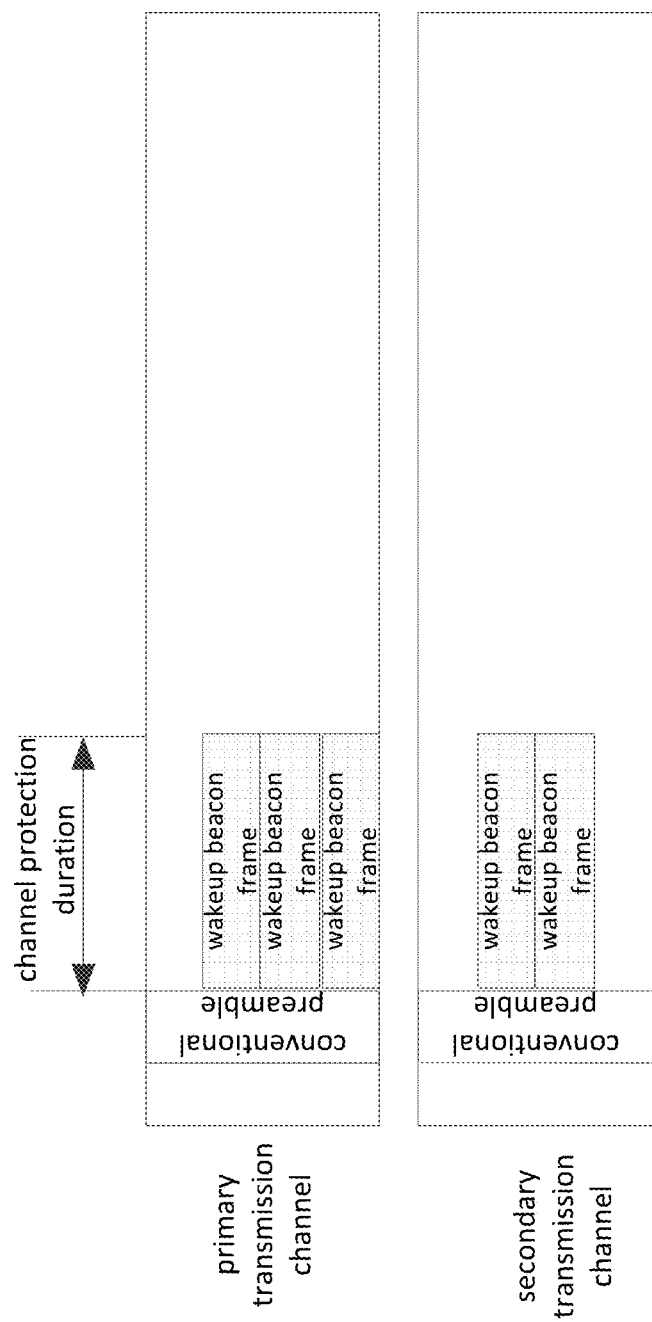
FIG. 11 is a schematic diagram of a first implementation of a fifth specific embodiment of the present disclosure.

FIG. 11 is a schematic diagram of a first implementation of a fifth embodiment of the present disclosure. As shown in FIG. 11, the AP simultaneously transmits the wakeup beacon frames in parallel on one or more wakeup channels of the primary and secondary transmission channels, and the bandwidth of each wakeup beacon frame is equal to that of the wakeup channel in which the wakeup beacon frame is located. To protect the transmission of the wakeup beacon frames, the AP uses a conventional preamble and/or a protection frame. The conventional preamble is included in a preamble of the wakeup beacon frame, and the conventional preamble is located at the starting position of the wakeup beacon frame. The wakeup beacon frames on all wakeup channels use a same conventional preamble. The bandwidth of the conventional preamble is equal to that of the primary or secondary transmission channel. Optionally, before the wakeup beacon frame is transmitted (in this case the wakeup beacon frame may or may not include a conventional preamble), the AP transmits the protection frame identifiable by a conventional station, and the bandwidth of the protection frame is equal to that of the primary or secondary transmission channel in which protection frame is located. An interval between the protection frame and the wakeup beacon frame is a short interframe interval (SIFS).

Figure 12:
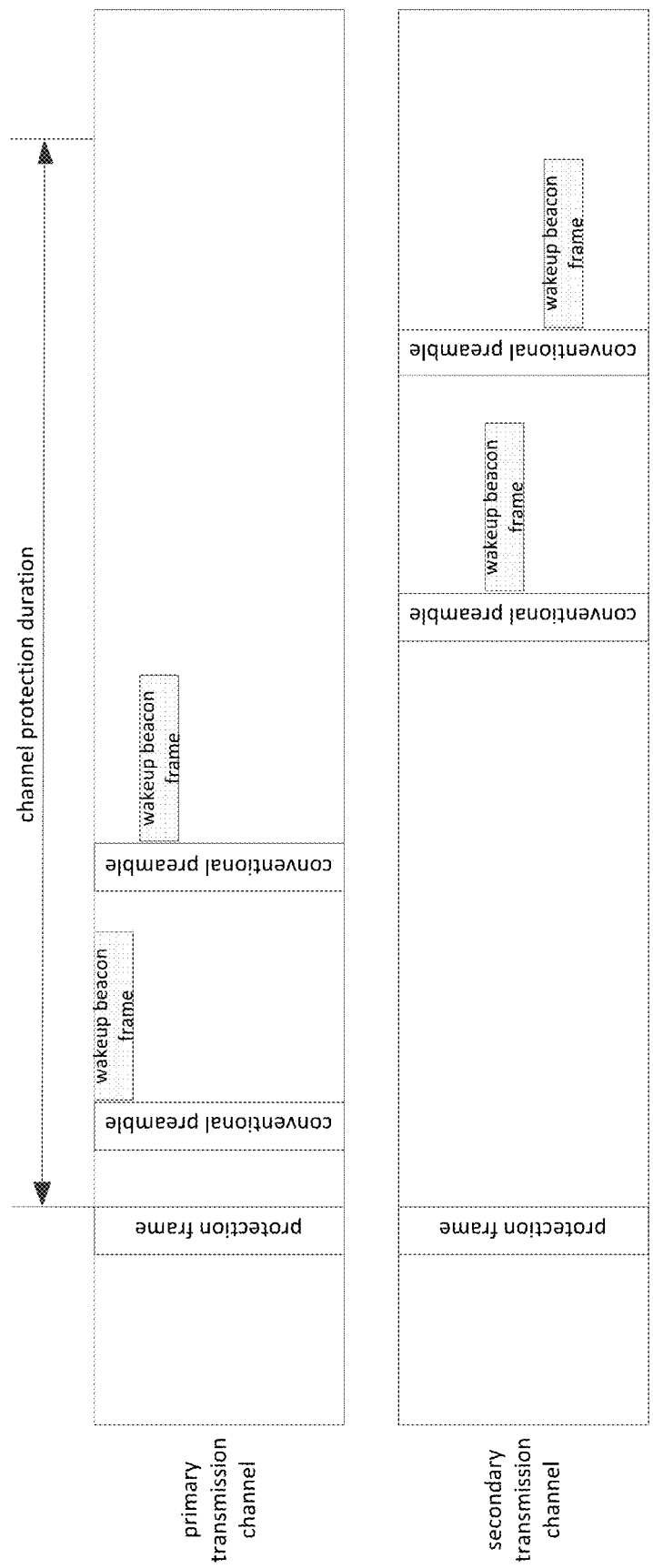
FIG. 12 is a schematic diagram of a second implementation of the fifth specific embodiment of the present disclosure.

FIG. 12 is a schematic diagram of a second implementation of the fifth embodiment of the present disclosure. As shown in FIG. 12, the AP transmits multiple wakeup beacon frames in a predetermined order on one or more wakeup channels of the primary and secondary transmission channels. The order of transmission may be from low to high, or high to low, based on a center frequency of the wakeup channels, or in ascending or descending order of a logical number of the wakeup channels. There is a certain interval between the wakeup beacon frames on two adjacent wakeup channels. The AP contends for transmitting the wakeup beacon frames on the multiple wakeup channels. There is a conventional preamble at the starting position of each wakeup beacon frame, and the bandwidth of the conventional preamble is equal to that of the primary or secondary transmission channel in which the wakeup beacon frame is located. Optionally, before the first wakeup beacon frame is transmitted (in this case, the wakeup beacon frame may or may not include a conventional preamble), the AP transmits the protection frame identifiable by a conventional station, and the bandwidth of the protection frame is equal to that of the primary or secondary transmission channel in which the protection frame is located. The channel occupation duration reserved by the protection frame is not less than a total duration for the AP to transmit the wakeup beacon frames on the multiple wakeup channels. If the AP uses the protection frame, the AP may directly transmit the wakeup beacon frames without using a contention access mode when the AP transmits the wakeup beacon frames on the multiple wakeup channels. An interval between the protection frame and the first wakeup beacon frame is a short interframe space (SIFS). In addition to the transmission protections by the conventional preamble and/or the protection frame, the AP may also transmit a radio frame on the primary transmission channel before transmitting the first wakeup beacon frame, and the radio frame carries a length of a protection period for notifying the AP of the duration that the channels are occupied by transmitting the multiple wakeup beacon frames on the multiple wakeup channels. Within the duration, only the AP is allowed to transmit in the BSS. In addition, in a case that the AP transmits the radio frame on the primary transmission channel to notify a channel protection period, it is unnecessary to transmit the protection frame for channel protection on the primary transmission channel. The protection frame may be transmitted only on the secondary transmission channel where the wakeup channels are located. The bandwidth of the radio frame is equal to that of the primary transmission channel.

Figure 13:
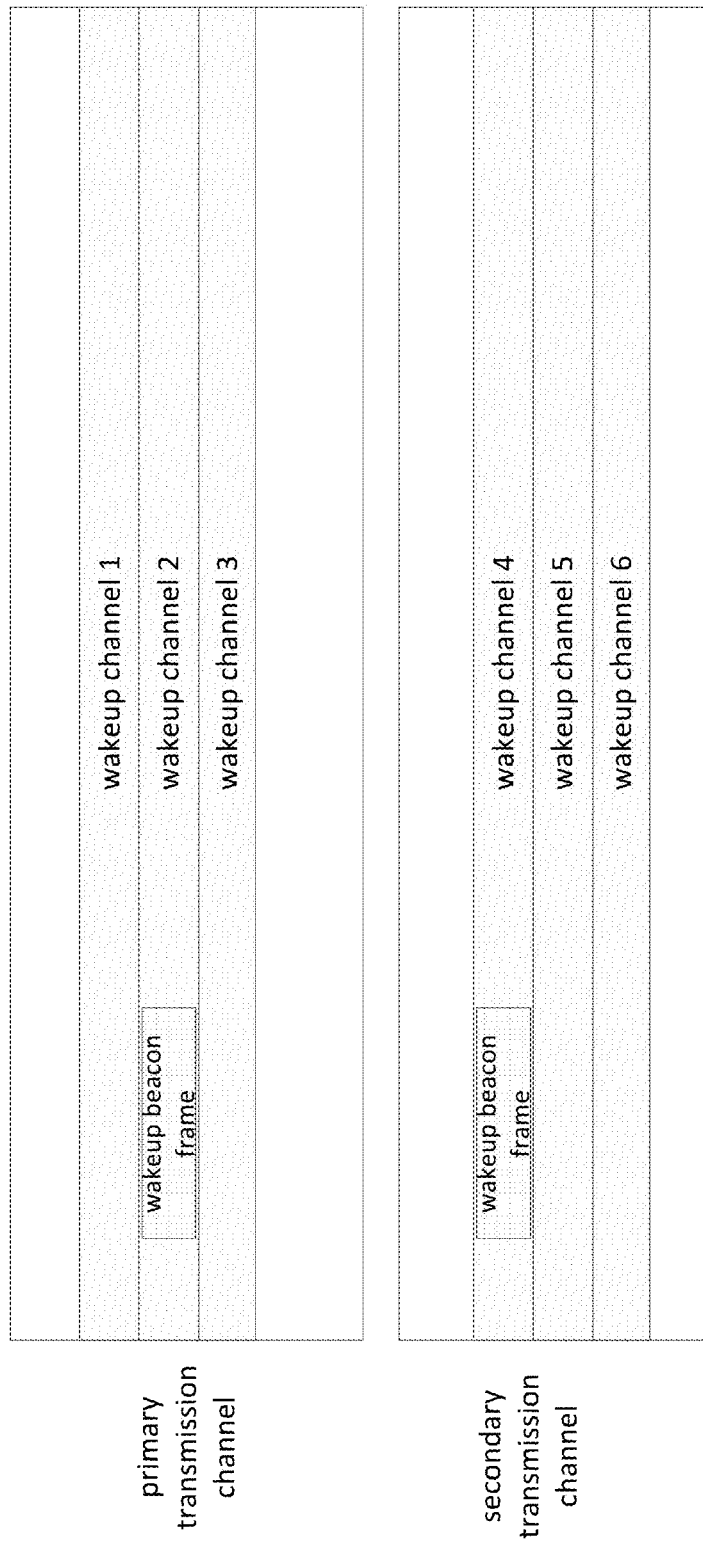
FIG. 13 is a schematic diagram of a sixth specific embodiment of the present disclosure.

FIG. 13 is a schematic diagram of a sixth embodiment of the present disclosure. As shown in FIG. 13, the AP or the system configures multiple wakeup channels in the primary transmission channel and each of the secondary transmission channels. The AP selects one wakeup channel in the transmission channels in which the multiple wakeup channels are located to transmit a wakeup beacon frame. The AP notifies a STA of a wakeup channel for receiving a wakeup signal and a wakeup channel for receiving a wakeup beacon frame that are configured for the STA (if they are not the same channel). The STA receives the wakeup signal on the wakeup channel of itself, and is switched to the channel for receiving the wakeup beacon frame to receive the wakeup beacon frame before a transmission timing of the wakeup beacon frame arrives.

Figure 14:
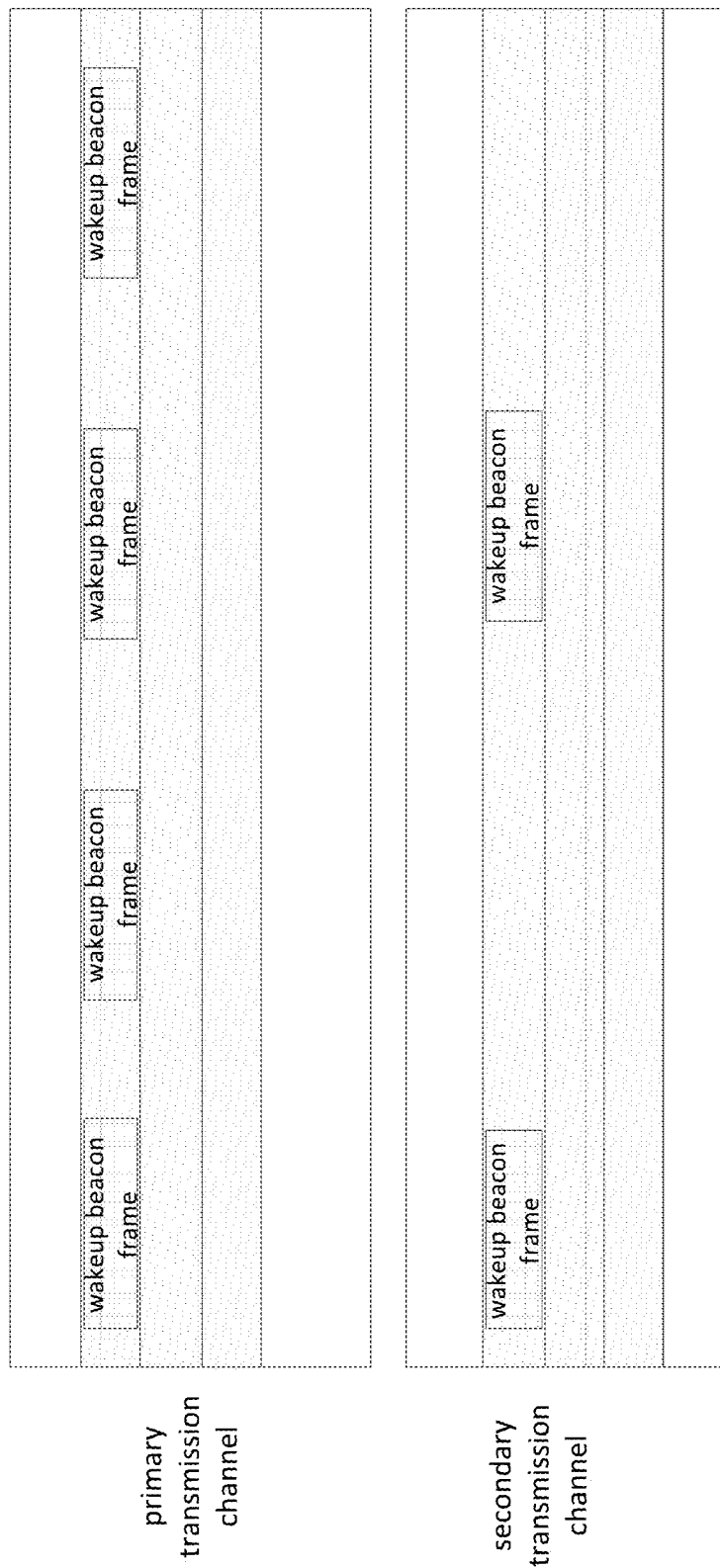
FIG. 14 is a schematic diagram of a seventh specific embodiment of the present disclosure.

FIG. 14 is a schematic diagram of a seventh embodiment of the present disclosure. In this embodiment, the AP transmits wakeup beacon frames on multiple wakeup channels. Transmission cycles of the wakeup beacon frames on the wakeup channels are configured as the same or different. As shown in FIG. 14, in the AP, there are three wakeup channels in the primary transmission channel, and three wakeup channels in the secondary transmission channel. One of the wakeup channels in the primary transmission channel and one of the wakeup channels in the secondary transmission channel are selected as the wakeup channel for transmitting the wakeup beacon frames. The transmission cycle for transmitting the wakeup beacon frames on the wakeup channel in the primary transmission channel is different from the transmission cycle for transmitting the wakeup beacon frames on the wakeup channel in the secondary transmission channel.

Figure 15:
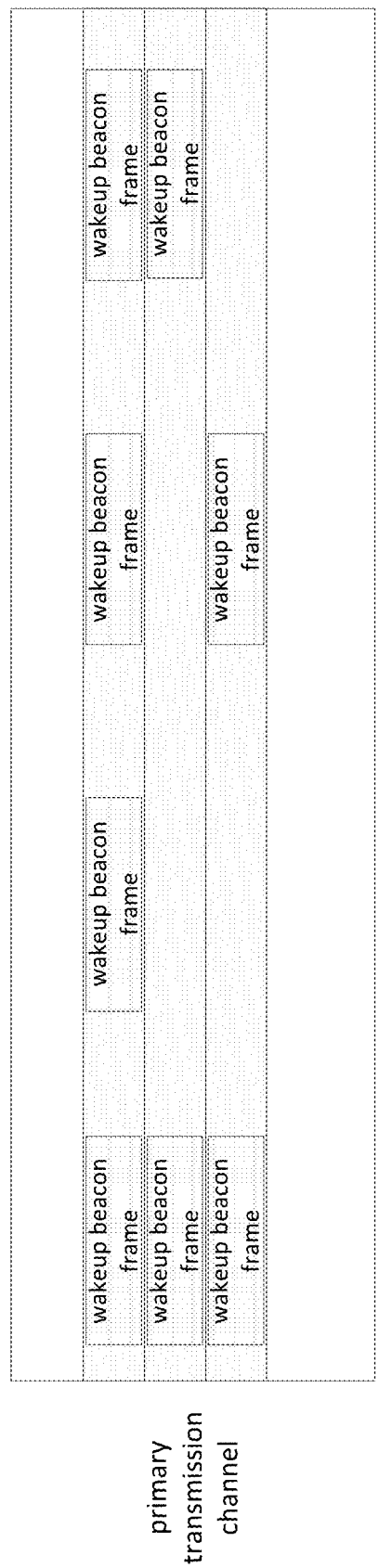
FIG. 15 is a schematic diagram of an eighth specific embodiment of the present disclosure.

FIG. 15 is a schematic diagram of an eighth embodiment of the present disclosure. As shown in FIG. 15, the AP configures three wakeup channels in the primary transmission channel. On the three wakeup channels, the wakeup beacon frames are transmitted in different cycles. Specifically, the AP may group the stations according to a specific parameter, configure a wakeup channel for each group of stations, notify the stations of the wakeup channel configured for the stations and a transmission cycle of the wakeup beacon frame, and configure the cycle for transmitting the wakeup beacon frame on the wakeup channel of a group of stations according to the parameters of this group of stations, and transmit the wakeup beacon frame according to the cycle. The specific parameter for grouping the stations may be a synchronization precision of station. Due to the different hardware and software capabilities of different stations, the time precisions that the stations may achieve are different. For example, the synchronization precision of some stations is ±20 ppm (the clock offset is 20 microseconds per second), and the synchronization precision of some other stations is ±40 ppm. The different synchronization precisions of the stations may be synchronized temporally and corrected by receiving the wakeup beacon frame in different cycles. Therefore, the AP may transmit the wakeup beacon frame in different cycles so as to save overhead.

Those skilled in the art should know that, when a signal transmitted by the AP is the wakeup beacon frame, since the wakeup beacon frame is transmitted periodically, the AP performs signal transmission and channel protection in accordance with the methods described in the embodiments of the present disclosure according to the transmission cycle of the wakeup beacon frame and the position and number of the wakeup channel when each transmission timing arrives. When a signal transmitted by the AP is the wakeup signal, the AP may perform signal transmission and channel protection in accordance with the methods of the embodiments of the present disclosure according to the service requirements.

Figure 16:
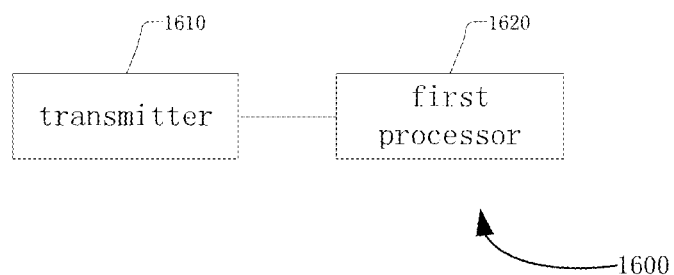
FIG. 16 is a block diagram of a communication device according to an embodiment of the present disclosure.

FIG. 16 is a block diagram of a communication device provided by an embodiment of the present disclosure. As shown in FIG. 16, the communication device 1600 includes a transmitter 1610 and a first processor 1620. The transmitter 1610 is configured to: transmit a signal on one or more first channels which are located in a primary transmission channel and/or a secondary transmission channel of a first communication node; and perform channel protection on a transmission channel in which the first channel is located and/or the primary transmission channel before transmitting the signal. The first processor 1620 is coupled to the transmitter 1610.

In some embodiments, the above channel protection is achieved by one of the following.

Transmitting a conventional preamble before transmitting the signal. The conventional preamble carries information about a length of time that a medium is to be occupied by the first communication node.

Here, before the signal is transmitted, a wakeup preamble and a frame body are also transmitted.

Transmitting a protection frame identifiable by a conventional station before transmitting the signal. The protection frame carries information about a length of time that the medium is to be occupied by the first communication node;

Transmitting a radio frame before transmitting the signal. The radio frame carries information about a length of time that the medium is to be occupied by the first communication node.

Those skilled in the art should know that, functions of the AP described in the first to eighth embodiments of the present disclosure may be achieved by the communication device 1600.

Figure 17:
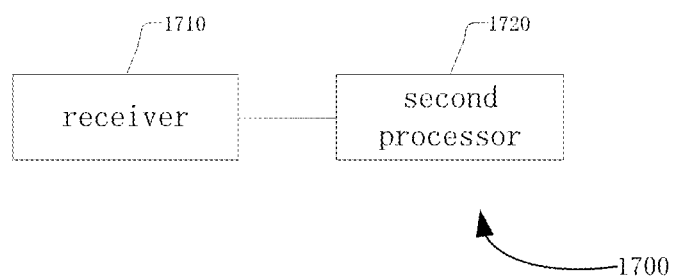
FIG. 17 is a block diagram of another communication device according to an embodiment of the present disclosure.

FIG. 17 is a block diagram of another communication device provided by an embodiment of the present disclosure. As shown in FIG. 17, the communication device 1700 includes a receiver 1710 and a second processor 1720. The receiver 1710 is configured to receive a signal transmitted by a first communication node on a first channel, wherein the first channel is located in a primary transmission channel and/or a secondary transmission channel of the first communication node; the second processor 1720 is coupled to the receiver 1710. In some embodiments, the receiver 1710 is further configured to receive a first information transmitted by the first communication node. The first information includes at least one of the following: the first channel allocated for the second communication node by the first communication node, and a transmission cycle of the signal.

In a case that the signal is a wakeup beacon frame, the receiver 1710 receives the wakeup beacon frame on the first channel according to the transmission cycle of the wakeup beacon frame when a transmission timing arrives.

In a case that the first channel allocated for receiving a wakeup signal is different from the wakeup channel for receiving the wakeup beacon frame, the receiver 1710 receives the wakeup signal on a first channel for transmitting the wakeup signal, and is switched to a first channel for transmitting the wakeup beacon frame to receive the wakeup beacon frame before a transmission timing of the wakeup beacon frame arrives.

Those skilled in the art should know that, functions of the STA described in the first to eighth embodiments of the present disclosure may be achieved by the communication device 1700.

In the foregoing embodiments of the present disclosure, the transmission channel may include a primary transmission channel (also referred to as a primary channel), and may also include a secondary transmission channel (which may also be referred to as a secondary channel), which may be determined by a person skilled in the art according to the context. The conventional preamble in each embodiment is only used as a description of the preamble that may be resolved by a conventional device, without further limitation. The description for each embodiment has its own emphasis, and the parts that are not detailed in a certain embodiment may be referred to the related description of other embodiments.

In addition, the functional units in various embodiments of the present disclosure may be integrated into one processing unit, or the units may be physically separated, or two or more units may be integrated into one unit. The above integrated unit may be implemented in a form of hardware or in a form of a software functional unit.

Each of the above units may be stored in a computer readable storage medium when implemented in a single software form and sold or used as a standalone product. Based on such understanding, a part of the technical solution of the present disclosure, which is essential or contributes to the prior art, or all or part of the technical solution, may be embodied in the form of a software product stored in a storage medium, which includes a number of instructions to cause a computer device (which may be a personal computer, a server or a network device, etc.) to perform all or part of the steps of the methods described in various embodiments of the present disclosure. The foregoing storage medium includes various medium capable of storing program codes, such as a U disk, a Read-Only Memory (ROM), a Random Access Memory (RAM), a portable hard drive, a magnetic disk, or an optical disk, and the like.

Accordingly, an embodiment of the present disclosure further provides a storage medium storing thereon a computer program which is executed by a processor to perform: transmitting a signal on one or more first channels which are located in a primary transmission channel and/or a secondary transmission channel of a first communication node; and performing channel protection on a transmission channel in which the first channel is located and/or the primary transmission channel before transmitting the signal.

Alternatively, the computer program is executed by a processor to perform: receiving a signal transmitted by a first communication node on a first channel which is located in a primary transmission channel and/or a secondary transmission channel of the first communication node.

While the embodiments of the present disclosure have been described above, the described embodiments are merely for the purpose of understanding the invention and are not intended to limit the invention. Any modification and variation in the form and details of the embodiments may be made by those skilled in the art to which the present invention belongs without departing from the spirit and scope of the invention. The patent protection scope of the present invention should be defined by the appended claims.

INDUSTRIAL APPLICABILITY

In the embodiments of the present disclosure, the first communication node transmits a signal on one or more first channels which are located in a primary transmission channel and/or a secondary transmission channel of the first communication node, and perform channel protection on a transmission channel on which the first channel is located and/or the primary transmission channel before transmitting the signal; the second communication node receives the signal transmitted by the first communication node on the first channel. In this way, it is achieved to transmit the signal on multiple first channels and protect a channel for transmitting the signal during the signal transmission, thereby reducing system loss and interference.

What is claimed is:

1. A signal transmission method, comprising:
transmitting, by a first communication node, a signal on one or more first channels which are located in a primary transmission channel and/or a secondary transmission channel of the first communication node, and performing channel protection on a transmission channel in which a first channel is located and/or the primary transmission channel before transmitting the signal, wherein performing channel protection is achieved by transmitting a radio frame before transmitting the signal, the radio frame carrying information about a length of time that a medium is to be occupied by the first communication node, and wherein the length of time is when the first communication node occupies the first channel in the primary transmission channel and/or the secondary transmission channel, and during the time, only the first communication node is allowed to perform transmission in a basic service set (BSS).

2. The method of claim 1, wherein a bandwidth of the first channel is less than that of the transmission channel in which the first channel is located, and the bandwidth of the signal is equal to that of the first channel which the signal is in.

3. The method of claim 1, wherein the signal is a wakeup beacon frame or a wakeup signal.

4. The method of claim 1, wherein the step of performing the channel protection is further achieved by one of:
transmitting a conventional preamble before transmitting the signal, the conventional preamble carrying information about a length of time that a medium is to be occupied by the first communication node; or
transmitting a protection frame identifiable by a conventional station before transmitting the signal, the protection frame carrying information about the length of time that the medium is to be occupied by the first communication node.

5. The method of claim 1, wherein the signal is a wakeup beacon frame, and the step of transmitting the signal on the one or more first channels comprises:
transmitting the wakeup beacon frame on the one or more first channels according to a transmission cycle of the wakeup beacon frame when a transmission timing arrives.

6. The method of claim 1, wherein the step of transmitting the signal on the one or more first channels comprises: transmitting a wakeup beacon frame by one or more of the first channels, wherein transmission cycles of the wakeup beacon frames in respective first channels are configured as the same or different.

7. The method of claim 1, further comprising:
grouping, by the first communication node, multiple second communication nodes communicating with the first communication node according to a specific parameter; and
configuring a transmission cycle of a wakeup beacon frame for each group of the second communication nodes, wherein the transmission cycles are the same or different.

8. The method of claim 7, wherein the first communication node configures the first channel for each group of the second communication nodes, and transmits on the first channel corresponding to each group of the second communication nodes according to the transmission cycle.

9. The method of claim 7, wherein the specific parameter is a synchronization precision of the second communication node.

10. The method of claim 1, further comprising: transmitting, by the first communication node, a first information before transmitting the signal, wherein the first information indicates at least one of: the first channel allocated for the second communication node, and a transmission cycle of the signal.

11. A communication method applied to a second communication node, comprising:
receiving, by the second communication node, a signal transmitted by a first communication node on a first channel, wherein the first channel is located in a primary transmission channel and/or a secondary transmission channel of the first communication node,
wherein channel protection is performed on a transmission channel in which the first channel is located and/or the primary transmission channel before the signal is transmitted, wherein performing channel protection is achieved by transmitting a radio frame before the signal is transmitted, the radio frame carrying information about a length of time that a medium is to be occupied by the first communication node, and wherein the length of time is when the first communication node occupies the first channel in the primary transmission channel and/or the secondary transmission channel, and during the time, only the first communication node is allowed to perform transmission in a basic service set (BSS).

12. The method of claim 11, wherein the second communication node receives a first information transmitted by the first communication node before receiving the signal, wherein the first information comprises at least one of: the first channel allocated for the second communication node by the first communication node, and a transmission cycle of the signal.

13. The method of claim 11, wherein a bandwidth of the first channel is less than that of a transmission channel in which the first channel is located, and a bandwidth of the signal is equal to that of the first channel which the signal is in.

14. The method of claim 11, wherein the signal is a wakeup beacon frame or a wakeup signal.

15. The method of claim 11, wherein in a case that the signal is a wakeup beacon frame, the second communication node receives the wakeup beacon frame on the first channel according to a transmission cycle of the wakeup beacon frame when a transmission timing arrives.

16. The method of claim 11, wherein the step of receiving, by the second communication node, the signal comprises: in a case that a first channel for receiving a wakeup signal allocated for the second communication node by the first communication node is different from a wakeup channel for receiving a wakeup beacon frame, the second communication node receives the wakeup signal on the first channel for transmitting the wakeup signal, and is switched to the first channel for transmitting the wakeup beacon frame to receiving the wakeup beacon frame.

17. A communication device comprising a transmitter and a processor, the transmitter being configured to perform the method of claim 1, and
the processor being coupled to the transmitter.

18. A communication device comprising a receiver and a processor, the receiver being configured to perform the method of claim 11, and
the processor being coupled to the receiver.

19. A computer-readable non-transitory storage medium comprising a stored program, wherein the program, when executed by a processor, causes the processor to perform the method of claim 1.

20. A computer-readable non-transitory storage medium comprising a stored program, wherein the program, when executed by a processor, causes the processor to perform the method of claim 11.

\* \* \* \* \*